(12) United States Patent
Homma et al.

(10) Patent No.: US 9,591,861 B2
(45) Date of Patent: Mar. 14, 2017

(54) OIL OR FAT COMPOSITION

(75) Inventors: Rika Homma, Utsunomiya (JP); Yoshihide Asabu, Sumida-ku (JP)

(73) Assignee: KOA CORPORATION, Tokyo (JP)

( * ) Notice: Subject to any disclaimer, the term of this patent is extended or adjusted under 35 U.S.C. 154(b) by 0 days.

(21) Appl. No.: 14/240,214

(22) PCT Filed: Aug. 21, 2012

(86) PCT No.: PCT/JP2012/071089
§ 371 (c)(1),
(2), (4) Date: Feb. 21, 2014

(87) PCT Pub. No.: WO2013/027731
PCT Pub. Date: Feb. 28, 2013

(65) Prior Publication Data
US 2014/0220223 A1    Aug. 7, 2014

(30) Foreign Application Priority Data
Aug. 22, 2011  (JP) ................. 2011-180848

(51) Int. Cl.
| | |
|---|---|
| A23D 7/01 | (2006.01) |
| A23D 9/007 | (2006.01) |
| A23D 7/005 | (2006.01) |
| C11C 1/08 | (2006.01) |
| C11C 3/06 | (2006.01) |

(52) U.S. Cl.
CPC .............. *A23D 7/01* (2013.01); *A23D 7/005* (2013.01); *A23D 9/007* (2013.01); *C11C 1/08* (2013.01); *C11C 3/06* (2013.01)

(58) Field of Classification Search
CPC .......... A23D 7/01; A23D 7/005; A23D 9/007; C11C 1/08; C11C 3/06
See application file for complete search history.

(56) References Cited

U.S. PATENT DOCUMENTS

| | | | |
|---|---|---|---|
| 3,634,473 A * | 1/1972 | Harwood ................. | 554/168 |
| 5,879,735 A | 3/1999 | Cain et al. | |
| 5,912,942 A * | 6/1999 | Schick et al. .............. | 378/98.8 |
| 5,962,058 A | 10/1999 | Ono et al. | |
| 6,004,611 A | 12/1999 | Gotoh et al. | |
| 6,022,579 A * | 2/2000 | Mori ................. | A23D 7/013 426/603 |
| 6,762,203 B2 * | 7/2004 | Koike ................. | A23D 9/00 514/546 |
| 6,764,707 B1 | 7/2004 | Masui et al. | |
| 6,852,758 B2 * | 2/2005 | Koike ................. | A23D 9/00 514/546 |
| 7,182,971 B2 | 2/2007 | Takase et al. | |
| 7,691,428 B2 * | 4/2010 | Skogerson et al. .......... | 426/607 |
| 8,884,043 B2 * | 11/2014 | Homma et al. ............. | 554/227 |
| 2001/0036502 A1 | 11/2001 | Koike et al. | |
| 2003/0054082 A1 * | 3/2003 | Koike et al. .............. | 426/601 |
| 2003/0104109 A1 * | 6/2003 | Jacobs et al. .............. | 426/602 |
| 2006/0281823 A1 * | 12/2006 | Uchikoshi ............. | A23D 7/011 516/21 |
| 2007/0141220 A1 * | 6/2007 | Lee ..................... | A21D 2/16 426/601 |
| 2007/0148312 A1 | 6/2007 | Skogerson et al. | |
| 2007/0148313 A1 * | 6/2007 | Skogerson ............. | A21D 2/16 426/602 |
| 2008/0269329 A1 | 10/2008 | Fujikawa et al. | |
| 2011/0135805 A1 * | 6/2011 | Doucet et al. ............. | 426/606 |
| 2012/0259133 A1 | 10/2012 | Homma et al. | |
| 2013/0023684 A1 | 1/2013 | Moriwaki et al. | |
| 2013/0230630 A1 | 9/2013 | Homma et al. | |
| 2013/0280407 A1 | 10/2013 | Homma et al. | |
| 2014/0113055 A1 * | 4/2014 | Saito et al. ................ | 426/601 |

FOREIGN PATENT DOCUMENTS

| | | |
|---|---|---|
| CN | 1809284 A | 7/2006 |
| CN | 101006181 A | 7/2007 |
| EP | 1 803 819 A2 | 7/2007 |
| JP | 63-301765 | 12/1988 |
| JP | 4-300826 | 10/1992 |
| JP | 07-038780 | 5/1995 |
| JP | 08-103236 A | 4/1996 |
| JP | 10-176181 | 6/1998 |
| JP | 11-243855 | 9/1999 |
| JP | 2001-008617 A | 1/2001 |
| JP | 2001-122778 A | 5/2001 |
| JP | 2001-262180 | 9/2001 |
| JP | 2002-322490 | 11/2002 |
| JP | 2005-176737 A | 7/2005 |
| JP | 2005-176738 A | 7/2005 |
| JP | 2007-112806 | 5/2007 |
| WO | WO 2004/069150 A2 | 8/2004 |

OTHER PUBLICATIONS

U.S. Appl. No. 14/350,955, filed Apr. 10, 2014, Homma.
U.S. Appl. No. 14/347,888, filed Mar. 27, 2014, Homma, et al.
U.S. Appl. No. 14/347,915, filed Mar. 27, 2014, Homma, et al.
U.S. Appl. No. 14/240,295, filed Feb. 21, 2014, Homma, et al.
U.S. Appl. No. 14/240,206, filed Feb. 21, 2014, Homma, et al.
U.S. Appl. No. 14/240,248, filed Feb. 21, 2014, Homma, et al.
U.S. Appl. No. 14/240,209, filed Feb. 21, 2014, Homma, et al.
International Search Report Issued Nov. 27, 2012 in PCT/JP12/071089 filed Aug. 21, 2012.

\* cited by examiner

*Primary Examiner* — Nikki H Dees
(74) *Attorney, Agent, or Firm* — Oblon, McClelland, Maier & Neustadt, L.L.P.

(57) ABSTRACT

Provided is a fat or oil composition, comprising 50 mass % or more of diacylglycerols whose constituent fatty acids comprise 12 mass % or more of fatty acids having 20 or more carbon atoms and 5 mass % or less of a total content of eicosapentaenoic acid and docosahexaenoic acid, and having an iodine value of a fat or oil of 120 or less.

18 Claims, No Drawings

OIL OR FAT COMPOSITION

FIELD OF THE INVENTION

The present invention relates to a fat or oil composition, which is suited for a raw material fat or oil for a water-in-oil emulsion such as butter cream.

BACKGROUND OF THE INVENTION

Butter cream is a water-in-oil emulsion obtained by adding, if necessary, a sugar or the like to a fat or oil such as butter, shortening, or margarine and foaming the mixture, and is widely used for topping, filling, sandwiching or the like in confectionery production, bread production, or the like.

Fats or oils used for butter cream are required to have foamability (creaming property) for holding air through stirring, and the foamability involves properties of crystals of the fats or oils. Therefore, partially hydrogenated oils of animal- and plant-derived fats or oils or the like have been widely used as raw material fats or oils, but have been required to have further improved foamability.

Meanwhile, a fat or oil containing diacylglycerols at high concentration has been known to have physiological effects such as suppression of an increase in triglyceride (neutral fat) in blood after meal and less accumulation in the body (Patent Documents 1 and 2), and hence are expected to be used as an alternative to conventional fats or oils in a fat or oil-rich food such as butter cream.

CITATION LIST

Patent Document

[Patent Document 1] JP-A-4-300826
[Patent Document 2] JP-A-10-176181

SUMMARY OF THE INVENTION

The present invention provides a fat or oil composition, comprising 50 mass % or more of diacylglycerols whose constituent fatty acids comprise 12 mass % or more of fatty acids having 20 or more carbon atoms and 5 mass % or less of a total content of eicosapentaenoic acid and docosahexaenoic acid, and having an iodine value of a fat or oil of 120 or less.

The present invention also provides a water-in-oil emulsion, comprising the fat or oil composition, and having a mass ratio between an oil phase and an aqueous phase of from 10:90 to 90:10.

DETAILED DESCRIPTION OF THE INVENTION

However, there is a problem in that conventional fats or oils including diacylglycerols are insufficient in foamability.

Therefore, the present invention relates to providing a fat or oil composition that is excellent in foamability and emulsion stability, can be used as a raw material fat or oil for butter cream, and has a high content of diacylglycerol.

The inventors of the present invention made intensive studies in view of the above-mentioned problems, and found that a fat or oil composition that contains high concentrations of diacylglycerols whose constituent fatty acids include fatty acids having 20 or more carbon atoms, eicosapentaenoic acid (EPA) and docosahexaenoic acid (DHA) in a predetermined range, and has an iodine value of a fat or oil equal to or lower than a predetermined level, is excellent in foamability and emulsion stability and is suited for a raw material fat or oil for a water-in-oil emulsion such as butter cream.

According to the present invention, it is possible to produce a fat or oil composition that can be used for preparing a water-in-oil emulsion having excellent foamability and satisfactory emulsion stability and has a high content of diacylglycerol.

The fat or oil composition according to the present invention contains 50 mass % (hereinafter referred to as "%") or more of the diacylglycerols. The content is preferably 55% or more, more preferably 60% or more, more preferably 65% or more, even more preferably 70% or more, and the upper limit thereof is preferably 95% or less, more preferably 90% or less, more preferably 85% or less, even more preferably 80% or less. Specifically, the content is preferably from 55 to 95%, more preferably from 60 to 95%, more preferably from 65 to 95%, more preferably from 70 to 85%, even more preferably from 70 to 80%. The content of the diacylglycerols that falls within the above-mentioned range is preferred from the viewpoints of physiological effects and satisfactory emulsion stability. It should be noted that, in the present invention, the "fat or oil" contains any one or more of triacylglycerol, diacylglycerol and monoacylglycerol.

The content of the fatty acids having 20 or more carbon atoms in the constituent fatty acids of the diacylglycerols is 12% or more, preferably from 14% or more, more preferably 16% or more, more preferably 18% or more, even more preferably 20% or more. In addition, the upper limit thereof is preferably 60% or less, more preferably 55% or less, even more preferably 50% or less. Specifically, the content is preferably from 12 to 60%, more preferably from 14 to 60%, more preferably from 16 to 55%, more preferably from 18 to 55%, even more preferably from 20 to 50%. The content of the fatty acids having 20 or more carbon atoms that falls within the above-mentioned range is preferred from the viewpoints of satisfactory foamability and emulsion stability.

The fatty acids having 20 or more carbon atoms may be any of saturated fatty acids and unsaturated fatty acids. Examples of the saturated fatty acids include arachidic acid, behenic acid, lignoceric acid, cerotic acid, montanoic acid, melissic acid, lacceric acid and the like. In addition, the unsaturated fatty acids may be any of monovalent unsaturated fatty acids and polyvalent unsaturated fatty acids, and examples thereof include gadoleic acid, dihomo-γ-linolenic acid, arachidonic acid, eicosapentaenoic acid, erucic acid, docosapentaenoic acid, docosahexaenoic acid, nervonic acid, hexacosanoic acid, octacosanoic acid and the like. The fatty acids each have preferably from 20 to 32 carbon atoms, more preferably from 20 to 26 carbon atoms, even more preferably from 20 to 24 carbon atoms, from the viewpoint of shape-retaining property.

The total content of eicosapentaenoic acid (EPA) and docosahexaenoic acid (DHA) in the constituent fatty acids of the diacylglycerols is 5% or less, preferably 4% or less, more preferably 3% or less, even more preferably 2.5% or less, from the viewpoints of satisfactory foamability and oxidation stability. It should be noted that the lower limit of the total content of EPA and DHA is preferably 0.

The remaining constituent fatty acids may be any of saturated fatty acids and unsaturated fatty acids. The saturated fatty acids each have preferably from 12 to 18 carbons atoms, more preferably from 14 to 18 carbons atoms, from the viewpoint of a taste and flavor. In addition, the unsaturated fatty acids each have preferably from 14 to 18 carbons atoms, more preferably from 16 to 18 carbons atoms, from the viewpoint of physiological effects.

The fat or oil composition in the present invention preferably contains triacylglycerols, and the content of the triacylglycerols is preferably from 1 to 49%, more preferably from 5 to 45%, more preferably from 5 to 40%, more preferably from 5 to 35%, even more preferably from 5 to 30%, from the viewpoint of industrial productivity.

In addition, the content of monoacylglycerols in the fat or oil composition is preferably 10% or less, more preferably from 0.01 to 8%, and the content of free fatty acids (salts) is 3.5% or less, more preferably from 0.01 to 1.5%, from the viewpoint of a taste and flavor or the like. The constituent fatty acids of the triacylglycerols and the monoacylglycerols are preferably the same as the constituent fatty acids of the diacylglycerols, from the viewpoints of physiological effects and the industrial productivity of the fat or oil.

In addition, the content of the saturated fatty acids in the constituent fatty acids of the fat or oil in the fat or oil composition is preferably 5% or more, more preferably 10% or more, even more preferably 20% or more from the viewpoint of a satisfactory texture. In addition, the upper limit of the content is preferably 90% or less, more preferably 80% or less, even more preferably 70% or less from the viewpoint of physiological functions. The saturated fatty acids each have preferably from 14 to 24 carbon atoms, more preferably from 16 to 22 carbon atoms.

In the fat or oil composition according to the present invention, the iodine value of the fat or oil is 120 or less, preferably 100 or less, more preferably 80 or less, more preferably from 100 to 20, even more preferably 80 to 20, from the viewpoint of satisfactory emulsion stability and foamability. The iodine value is an indicator of the total number of unsaturated double bonds present in an oil.

The fat or oil composition according to the present invention may be prepared from a diacylglycerol-containing fat or oil.

The diacylglycerol-containing fat or oil may be obtained through an esterification reaction of a fat or oil-derived fatty acid and glycerin, a glycerolysis reaction of a fat or oil and glycerin, or the like. From the viewpoint of industrial productivity, the diacylglycerol-containing fat or oil is preferably obtained by the glycerolysis reaction of the fat or oil and glycerin or the like.

The esterification reaction and/or the glycerolysis reaction are roughly classified into chemical methods using a chemical catalyst such as an alkali metal or an alloy thereof, an oxide, hydroxide, or alkoxide having from 1 to 3 carbon atoms of an alkali metal or an alkali earth metal, and enzymatic methods using an enzyme such as a lipase. The reactions are preferably carried out under enzymatically mild conditions by using a lipase or the like as the catalyst, from the viewpoint of a taste and flavor or the like. The reactions are preferably carried out by the chemical methods, from the viewpoint of reducing the content of the triacylglycerols in final products.

After the esterification reaction and/or the glycerolysis reaction, a purification step usually employed for the fat or oil may be carried out. Specific examples thereof include steps of acid treatment, water washing, decoloration, deodorization or the like.

The raw material fat or oil for the fatty acid to be used in the esterification reaction or the raw material fat or oil to be used in the glycerolysis reaction may be any of a plant-derived fat or oil and an animal-derived fat or oil, and hydrogenated fish oil obtained by hydrogenating fish oil is suitably used because the oil contains fatty acids having 20 or more carbon atoms at a high content.

The hydrogenated fish oil may be obtained through a hydrogenation reaction for fish oil using the iodine value as an indicator. The kind of the fish oil is not particularly limited, and examples thereof include fats or oils derived from bonito, tuna, sardine, krill, mackerel, saury, shark, whale or the like. In the case of using the hydrogenated fish oil as the raw material fat or oil, the iodine value of the hydrogenated fish oil is preferably 140 or less, more preferably 120 or less, more preferably 100 or less, more preferably from 100 to 20, even more preferably from 80 to 20, from the viewpoint of industrial productivity.

In addition, the melting point of the hydrogenated fish oil is preferably from 20° C. to 50° C., more preferably from 22° C. to 48° C., even more preferably from 24° C. to 46° C., from the viewpoints of satisfactory shape-retaining property and a satisfactory texture.

In addition, a specific raw material for the plant-derived fat or oil or the animal-derived fat or oil, which may be used as the raw material fat or oil, may be exemplified by: plant-derived fats or oils such as soybean oil, rapeseed oil, safflower oil, rice oil, corn oil, sunflower oil, cotton seed oil, olive oil, sesame oil, peanut oil, Job's tears seed oil, wheat germ oil, Japanese basil oil, linseed oil, perilla oil, sacha inchi oil, walnut oil, kiwi seed oil, salvia seed oil, grape seed oil, macadamia nut oil, hazelnut oil, pumpkin seed oil, camellia oil, tea seed oil, borage oil, palm oil, palm olein, palm stearin, coconut oil, palm kernel oil, cacao butter, sal butter, shea butter, and algae oil; and animal-derived fats or oils such as lard, beef tallow, and butter fat. In addition, fats or oils such as transesterified oils, hydrogenated oils, and fractionated oils thereof may be used.

The fats or oils may be used singly or may be mixed appropriately before use.

In addition, if necessary, a usual edible fat or oil may be blended in a diacylglycerol-containing fat or oil prepared by the above-mentioned method to prepare the fat or oil composition according to the present invention. The fats or oils listed above as the raw material fats or oils may be used as the edible fat or oil.

The fat or oil composition according to the present invention preferably contains an antioxidant. The content of the antioxidant in the fat or oil composition is preferably from 0.005 to 0.5%, more preferably from 0.04 to 0.25%, even more preferably from 0.08 to 0.2%, from the viewpoints of, for example, a taste and flavor, oxidation stability, and suppression of coloration. Any antioxidant that is usually used in a food may be used as the antioxidant. It is possible to use, for example, vitamin E, butylhydroxytoluene (BHT), butylhydroxyanisole (BHA), t-butylhydroquinone (TBHQ), vitamin C or derivatives thereof, phospholipids, and natural antioxidants such as a rosemary extract.

The fat or oil composition according to the present invention can be used for a water-in-oil emulsion. A mass ratio between an aqueous phase and an oil phase is not particularly limited, and is preferably "oil phase:aqueous phase"=from 10:90 to 90:10, more preferably "oil phase: aqueous phase"=from 20:80 to 80:20, even more preferably "oil phase:aqueous phase"=from 30:70 to 70:30.

In the case where the fat or oil composition is formed into an emulsion, a component usually used for an emulsion, such as an emulsifier, an antioxidant, a stabilizer, a thickener, a gelling agent, or a surfactant, may be appropriately blended. Further, another fat or oil may be blended in the oil phase in addition to the fat or oil composition according to the present invention. Examples of another fat or oil include usual animal- and plant-derived edible fats or oils as mentioned above and processed fats or oils.

The fat or oil composition according to the present invention is in a solid state at normal temperature (25° C.), and can be applied as an edible fat or oil to a variety of foods and beverages. In particular, the fat or oil composition is suited for a raw material fat or oil for a water-in-oil emulsion such as butter cream used for topping, filling, sandwiching or the like in confectionery production, bread production, or the like because the composition is excellent in foamability and satisfactory in emulsion stability.

Next, aspects and preferred embodiments of the present invention are described.

<1> A fat or oil composition, comprising 50 mass % or more of diacylglycerols whose constituent fatty acids comprise 12 mass % or more of fatty acids having 20 or more carbon atoms and 5 mass % or less of a total content of eicosapentaenoic acid and docosahexaenoic acid, and having an iodine value of a fat or oil of 120 or less.

<2> The fat or oil composition according to Item <1>, in which the content of the diacylglycerols in the fat or oil composition is 55 mass % or more, preferably 60 mass % or more, more preferably 65 mass % or more, even more preferably 70 mass % or more, and the upper limit thereof is preferably 95 mass % or less, more preferably 90 mass % or less, more preferably 85 mass % or less, even more preferably 80 mass % or less.

<3> The fat or oil composition according to Item <1> or <2>, in which the content of the fatty acids having 20 or more carbon atoms in the constituent fatty acids of the diacylglycerols is 14 mass % or more, preferably 16 mass % or more, more preferably 18 mass % or more, even more preferably 20 mass % or more, and the upper limit thereof is preferably 60 mass % or less, more preferably 55 mass % or less, even more preferably 50 mass % or less.

<4> The fat or oil composition according to any one of Items <1> to <3>, in which the fatty acids having 20 or more carbon atoms each have from 20 to 32 carbon atoms, preferably from 20 to 26 carbon atoms, more preferably from 20 to 24 carbon atoms.

<5> The fat or oil composition according to any one of Items <1> to <4>, in which the total content of eicosapentaenoic acid (EPA) and docosahexanoic acid (DHA) in the constituent fatty acids of the diacylglycerols is 4 mass % or less, preferably 3 mass % or less, more preferably 2.5 mass % or less, and the lower limit thereof is preferably 0.

<6> The fat or oil composition according to any one of Items <1> to <5>, in which the remaining constituent fatty acids of the diacylglycerols may be any of saturated fatty acids and unsaturated fatty acids, the saturated fatty acids each have from 12 to 18 carbon atoms, preferably from 14 to 18 carbon atoms, and the unsaturated fatty acids each have from 14 to 18 carbon atoms, preferably from 16 to 18 carbon atoms.

<7> The fat or oil composition according to any one of Items <1> to <6>, further comprising preferably from 1 to 49 mass %, more preferably from 5 to 45 mass %, more preferably from 5 to 40 mass %, more preferably from 5 to 35 mass %, even more preferably from 5 to 30 mass % of triacylglycerols.

<8> The fat or oil composition according to any one of Items <1> to <7>, further comprising 10 mass % or less, preferably from 0.01 to 8 mass % of monoacylglycerols, and 3.5 mass % or less, preferably from 0.01 to 1.5 mass % of free fatty acids (salts).

<9> The fat or oil composition according to any one of Items <1> to <8>, in which the content of the saturated fatty acids in the constituent fatty acids of the fat or oil in the fat or oil composition is preferably 5 mass % or more, more preferably 10 mass % or more, even more preferably 20 mass % or more, and the upper limit thereof is 90 mass % or less, more preferably 80 mass % or less, even more preferably 70 mass % or less.

<10> The fat or oil composition according to any one of Items <1> to <9>, in which the iodine value of the fat or oil in the fat or oil composition is 100 or less, preferably 80 or less, more preferably from 100 to 20, even more preferably from 80 to 20.

<11> The fat or oil composition according to any one of Items <1> to <10>, further comprising from 0.005 to 0.5 mass %, preferably from 0.04 to 0.25 mass %, more preferably from 0.08 to 0.2 mass % of an antioxidant.

<12> A water-in-oil emulsion, comprising the fat or oil composition according to any one of Items <1> to <11>.

<13> The water-in-oil emulsion according to Item <12>, in which the water-in-oil emulsion has a mass ratio between an oil phase and an aqueous phase of "oil phase:aqueous phase"=from 10:90 to 90:10, preferably "oil phase:aqueous phase"=from 20:80 to 80:20, more preferably "oil phase:aqueous phase"=from 30:70 to 70:30.

<14> The water-in-oil emulsion according to Item <12> or <13>, which is butter cream.

EXAMPLE

Analysis Method (i) Composition of Glycerides in Fat or Oil

About 10 mg of a fat or oil sample and 0.5 mL of a trimethylsilylating agent ("Silylating agent TH," manufactured by Kanto Chemical Co., Inc.) were placed in a glass sample bottle, and the bottle was sealed and heated at 70° C. for 15 minutes. 1.0 mL of water and 1.5 mL of hexane were added thereto, and the bottle was shaken. The bottle was allowed to stand still, and then the upper layer was analyzed by gas-liquid chromatography (GLC).

<GLC Conditions>
(Conditions)

Apparatus: Agilent 6890 Series (manufactured by Agilent Technologies)

Integrator: ChemStation B 02.01 SR2 (manufactured by Agilent Technologies)

Column: DB-1ht (manufactured by Agilent J&W)

Carrier gas: 1.0 mL He/min

Injector: Split (1:50), T=320° C.

Detector: FID, T=350° C.

Oven temperature: increased from 80° C. to 340° C. at 10° C./min and kept for 15 minutes (ii) Composition of Constituent Fatty Acids in Fat or Oil Fatty acid methyl esters were prepared in accordance with "Preparation method for fatty acid methyl ester (2.4.1.-1996)" described in "Standard Method for Analysis of Fats and Oils" edited by Japan Oil Chemists' Society, and the resultant fat or oil samples were subjected to measurement in accordance with American Oil Chemists. Society Official Method Ce 1f-96 (GLC method).

It should be noted that all signals not identified as the saturated fatty acids and cis unsaturated fatty acids were regarded as trans unsaturated fatty acids.

(iii) Iodine Value

The iodine value was measured in accordance with "Iodine value (Wijs-Cyclohexane Method) (2.3.4.1-1996)" described in "Standard Method for Analysis of Fats and Oils" edited by Japan Oil Chemists' Society.

(Preparation of Fats or Oils A to H)

(1) Fats or Oils A to C 100 parts by mass of hydrogenated fish oil (melting point: 29° C., iodine value: 79, Kao Corporation) and 40 parts by mass of glycerin were mixed, and the mixture was subjected to a glycerolysis reaction using sodium methylate as a catalyst, thereby obtaining a diacylglycerol (DAG)-containing fat or oil. Fatty acids and monoacylglycerols were removed from the resultant glycerolysis reaction product by distillation, and the resultant was treated with an acid (a 10% aqueous solution of citric acid was added at a concentration of 2% by mass relative to the resultant), washed with water (distilled water three times), and brought into contact with activated clay (GALLEON EARTH V2R, MIZUSAWA INDUSTRIAL CHEMICALS, LTD.), thereby obtaining a decolored oil. Further, the oil was brought into contact with water vapor to deodorize the oil, thereby obtaining a fat or oil A (DAG: 78%).

In the same manner as the fat or oil A, 100 parts by mass of hydrogenated fish oil (melting point: 42° C., iodine value: 52, MIYOSHI OIL & FAT CO., LTD.) and 40 parts by mass of glycerin were used to obtain a fat or oil B (DAG: 74%).

In the same manner as the fat or oil A, 100 parts by mass of refined fish oil (Kao Corporation) and 40 parts by mass of glycerin were used to obtain a fat or oil C (DAG: 76%).

(2) Fats or Oils D and E 100 parts by mass of palm oil fatty acid and 20 parts by mass of glycerin were mixed, and the mixture was subjected to an esterification reaction using an enzyme, thereby obtaining a DAG-containing fat or oil. Fatty acids and monoacylglycerols were removed from the resultant esterification reaction product by distillation, and the resultant was treated in the same manner as the fat or oil A, thereby obtaining a fat or oil D (DAG: 80%).

In the same way as the fat or oil D, 100 parts by mass of a mixed fatty acid of "soybean oil fatty acid: rapeseed oil fatty acid"=7:3 (mass ratio) and 20 parts by mass of glycerin were used to obtain a fat or oil E (DAG: 86%).

Table 1 shows analyzed values for the fats or oils A to E.

(3) Fats or Oils F to H

Fats or oils having the composition shown in Table 1 (fat or oil F: hydrogenated fish oil (melting point: 29° C., Kao Corporation), fat or oil G: hydrogenated fish oil (melting point: 36° C., Kao Corporation), and fat or oil H: refined fish oil (Kao Corporation)) were used as fats or oils F to H.

Examples 1 to 3 and Comparative Examples 1 to 7

(1) The fats or oils A to H were mixed at the ratios shown in Table 2, and melted at 80° C. to prepare homogeneous mixtures. The mixtures were cooled to 25° C. while being kneaded using a chiller (emulsifying kneader, Tama Seiki Kogyo Co., Ltd.), thereby obtaining fat or oil compositions.

The resultant fat or oil compositions were preserved at 5° C. for 1 day, successively preserved at 20° C. for 1 day, and then preserved in a refrigerator (5° C.), thereby obtaining fat or oil samples. The fat or oil samples were evaluated for their foamability.

(Foamability Test)

200 g of each of the fat or oil samples were stirred with a Hobart mixer (model N-50: manufactured by Hobart Corporation) at a middle speed for 20 minutes to foam the mixture. After the foaming, the volume per g of the fat or oil sample (specific volume: ml/g) was measured to evaluate the foamability.

4: Specific volume of 3 or more

3: Specific volume of 2.7 or more and less than 3

2: Specific volume of 2.5 or more and less than 2.7

1: Specific volume of less than 2.5

(2) Preparation of Water-in-Oil Emulsion

Stirring emulsification (7,000 rpm, 10 minutes) was carried out using a homomixer (manufactured by PRIMIX Corporation) while 20 parts by mass of water heated at 50° C. was gradually added to 80 parts by mass of each of the above-mentioned fat or oil compositions heated at 50° C., thereby obtaining a water-in-oil emulsion.

100 mL of the water-in-oil emulsion prepared in the foregoing were collected in an emulsification test tube, and evaluated for emulsion stability in accordance with the following criteria based on the amount of separated water determined after 2 hours at 50° C. Table 2 shows the results.

(Evaluation of Emulsion Stability)

4: Very satisfactory emulsion stability without separation of water

3: Satisfactory emulsified state even with separation of a small amount of water 2: Satisfactory emulsified state even with separation of small amounts of water and oil 1: Poor emulsified state with separation of water and oil

TABLE 1

| | Fatty acid composition (%) | | | | | | | | | Glyceride composition (%) | | |
|---|---|---|---|---|---|---|---|---|---|---|---|---|---|
| | 14 carbon atoms | 16 carbon atoms | 18 carbon atoms | 20 carbon atoms (except EPA) | 22 carbon atoms (except DHA) | EPA | DHA | Fatty acids having 20 or more carbon atoms (%) | Saturated fatty acids (%) | Iodine value (IV) | MAG | DAG | TAG |
| Fat or oil A | 4.4 | 14.5 | 32.6 | 24.1 | 17.0 | 2.0 | 0.0 | 43.0 | 24.3 | 79.2 | 0.0 | 77.9 | 22.1 |
| Fat or oil B | 9.0 | 28.6 | 34.3 | 8.4 | 12.9 | 0.0 | 0.0 | 21.3 | 55.7 | 52.3 | 0.0 | 74.4 | 25.4 |
| Fat or oil C | 5.7 | 14.8 | 26.2 | 6.5 | 12.5 | 9.2 | 12.0 | 40.2 | 24.9 | 146.8 | 0.1 | 75.5 | 24.3 |
| Fat or oil D | 1.0 | 43.3 | 55.2 | 0.0 | 0.0 | 0.0 | 0.0 | 0.0 | 48.7 | 50.1 | 0.6 | 80.0 | 19.4 |
| Fat or oil E | 0.0 | 3.0 | 95.7 | 0.0 | 0.0 | 0.0 | 0.0 | 0.0 | 4.2 | 115.0 | 0.5 | 86.0 | 13.5 |
| Fat or oil F | 6.6 | 17.2 | 30.0 | 19.9 | 13.9 | 0.2 | 0.9 | 34.9 | 30.0 | 83.4 | 0.3 | 3.4 | 96.3 |
| Fat or oil G | 8.2 | 24.0 | 34.4 | 7.9 | 15.6 | 0.0 | 0.0 | 23.5 | 44.2 | 69.0 | 0.1 | 2.2 | 97.6 |
| Fat or oil H | 5.2 | 16.0 | 28.0 | 4.1 | 9.7 | 11.9 | 11.7 | 37.4 | 25.9 | 141.5 | 0.6 | 2.3 | 97.0 |

MAG: Monoacylglycerol
DAG: Diacylglycerol
TAG: Triacylglycerol

TABLE 2

|  | Example | | | Comparative Example | | | | | | |
| --- | --- | --- | --- | --- | --- | --- | --- | --- | --- | --- |
|  | 1 | 2 | 3 | 1 | 2 | 3 | 4 | 5 | 6 | 7 |
| Fat or oil A | 100 |  | 70 |  |  |  |  |  |  | 50 |
| Fat or oil B |  | 100 |  |  |  |  |  |  | 40 |  |
| Fat or oil C |  |  |  | 100 |  |  |  |  |  | 50 |
| Fat or oil D |  |  | 30 |  |  |  |  |  |  |  |
| Fat or oil E |  |  |  |  | 100 |  |  |  |  |  |
| Fat or oil F |  |  |  |  |  | 100 |  |  | 60 |  |
| Fat or oil G |  |  |  |  |  |  | 100 |  |  |  |
| Fat or oil H |  |  |  |  |  |  |  | 100 |  |  |
| Ratio in fat or oil composition | | | | | | | | | | |
| DAG (%) | 77.9 | 74.4 | 78.5 | 75.5 | 86.0 | 3.4 | 2.2 | 2.3 | 81.4 | 76.7 |
| Ratio in constituent fatty acids of DAG | | | | | | | | | | |
| Fatty acids having 20 or more carbon atoms (%) | 43.0 | 21.3 | 30.1 | 40.2 | 0.0 | 34.9 | 23.5 | 37.4 | 8.5 | 41.6 |
| EPA + DHA (%) | 2.0 | 0.0 | 1.4 | 21.2 | 0.0 | 1.1 | 0.0 | 23.6 | 0.0 | 11.6 |
| Ratio in constituent fatty acids of fat or oil | | | | | | | | | | |
| Saturated fatty acids (%) | 24.3 | 55.7 | 31.6 | 24.9 | 4.2 | 30.0 | 44.2 | 25.9 | 24.8 | 24.6 |
| Iodine value (IV) | 79 | 52 | 70 | 147 | 115 | 83 | 69 | 142 | 90 | 113 |
| Evaluation of fat or oil composition | | | | | | | | | | |
| Foamability | 4 | 4 | 4 | 1 | 1 | 2 | 1 | 1 | 2 | 2 |
| Evaluation of water-in-oil emulsion | | | | | | | | | | |
| Emulsion stability | 4 | 4 | 4 | 3 | 2 | 1 | 2 | 1 | 1 | 1 |

As is apparent from Table 2, it found that the fat or oil compositions according to the present invention exhibit satisfactory foamability as compared to those of Comparative Examples. In addition, it found that the water-in-oil compositions including the fat or oil compositions according to the present invention were excellent in emulsion stability.

The invention claimed is:

1. A fat or oil composition, comprising:
   from 65 mass % to 95 mass % of diacylglycerols whose constituent fatty acids comprise 12 mass % or more of fatty acids having 20 or more carbon atoms and 5 mass % or less of a total content of eicosapentaenoic acid and docosahexaenoic acid, and
   from 5 mass % to 35 mass % of triacylglycerols,
   wherein an iodine value of the fat or oil composition is 120 or less.

2. The fat or oil composition according to claim 1, wherein the constituent fatty acids of the diacylglycerols comprise 14 mass % or more and 60 mass % or less of the fatty acids having 20 or more carbon atoms and 4 mass % or less of the total content of eicosapentaenoic acid and docosahexaenoic acid.

3. The fat or oil composition according to claim 1, wherein the constituent fatty acids of the diacylglycerols comprise 16 mass % or more and 55 mass % or less of the fatty acids having 20 or more carbon atoms and 3 mass % or less of the total content of eicosapentaenoic acid and docosahexaenoic acid.

4. The fat or oil composition according to claim 1, wherein the constituent fatty acids of the diacylglycerols comprise 20 mass % or more and 50 mass % or less of the fatty acids having 20 or more carbon atoms and 0 mass % or more and 2.5 mass % or less of the total content of eicosapentaenoic acid and docosahexaenoic acid.

5. The fat or oil composition according to claim 1, wherein the iodine value of the fat or oil is 100 or less.

6. The fat or oil composition according to claim 1, wherein the iodine value of the fat or oil is 80 or less.

7. The fat or oil composition according to claim 4, wherein a content of the diacylglycerols is 70 mass % or more and 85 mass % or less.

8. The fat or oil composition according to claim 1, wherein a content of saturated fatty acids in constituent fatty acids of the fat or oil is 5 mass % or more.

9. The fat or oil composition according to claim 2, wherein a content of saturated fatty acids in constituent fatty acids of the fat or oil is 10 mass % or more and 80 mass % or less.

10. The fat or oil composition according to claim 4, wherein a content of saturated fatty acids in constituent fatty acids of the fat or oil is 20 mass % or more and 70 mass % or less.

11. The fat or oil composition according to claim 1, further comprising 10 mass % or less of monoacylglycerols and 3.5 mass % or less of free fatty acids, in the fat or oil composition.

12. The fat or oil composition according to claim 1, further comprising from 0.01 to 8 mass % of monoacylglycerols and from 0.01 to 1.5 mass % of free fatty acids, in the fat or oil composition.

13. The fat or oil composition according to claim 1, further comprising from 0.01 to 8 mass % of monoacylglycerols and from 0.01 to 1.5 mass % of free fatty acids, in the fat or oil composition,
   wherein a triacylglycerol content of the fat or oil composition is from 12 mass % to 35 mass %.

14. A water-in-oil emulsion, comprising the fat or oil composition according to claim 1, and having a mass ratio between an oil phase and an aqueous phase of from 10:90 to 90:10.

15. A foam, comprising the fat or oil composition according to claim 1.

16. The foam of claim 15, wherein a specific volume thereof is at least 2.7 ml/g.

17. The fat or oil of claim 1, wherein the fat or oil is capable of foaming to a specific volume of at least 2.7 ml/g.

18. The fat or oil composition of claim 1, wherein the fat or oil is capable of foaming to a specific volume of at least 3 ml/g.

* * * * *

UNITED STATES PATENT AND TRADEMARK OFFICE
CERTIFICATE OF CORRECTION

PATENT NO. : 9,591,861 B2
APPLICATION NO. : 14/240214
DATED : March 14, 2017
INVENTOR(S) : Rika Homma et al.

It is certified that error appears in the above-identified patent and that said Letters Patent is hereby corrected as shown below:

On the Title Page

Item (73), the Assignee's name information is incorrect. Item (73) should read:
-- (73) Assignee: KAO CORPORATION, Tokyo (JP) --

Signed and Sealed this
Tenth Day of April, 2018

Andrei Iancu
*Director of the United States Patent and Trademark Office*